Nov. 14, 1961 A. ASHKIN 3,009,078

LOW NOISE AMPLIFIER

Filed June 23, 1958 3 Sheets-Sheet 1

INVENTOR
A. ASHKIN
BY David P. Kelley
ATTORNEY

Nov. 14, 1961 A. ASHKIN 3,009,078

LOW NOISE AMPLIFIER

Filed June 23, 1958 3 Sheets-Sheet 2

INVENTOR
A. ASHKIN
BY David P. Kelley
ATTORNEY

INVENTOR
A. ASHKIN
BY David P. Kelley
ATTORNEY

United States Patent Office 3,009,078

Patented Nov. 14, 1961

3,009,078

LOW NOISE AMPLIFIER

Arthur Ashkin, Bernardsville, N.J., assignor to Bell Telephone Laboratories, Incorporated, New York, N.Y., a corporation of New York Filed June 23, 1958, Ser. No. 743,672

32 Claims. (Cl. 315—3)

This invention relates to high frequency electron discharge devices and more particularly to those of the velocity modulation type.

Such velocity modulation devices as the traveling wave tube or the klystron, for example, have proven capable of amplification and oscillations at very high frequencies with reasonably good efficiency and stability, and in the case of the traveling wave tube such efficiency and stability are maintained over an exceedingly wide band of frequencies. Detracting from the significant advantages realized by such devices, however, is the noise introduced into the signal resulting from the utilization of an electron beam. Much effort has been directed toward reducing or eliminating this noise, but because of the fact that there are a plurality of sources of electron beam noise, an effective way to suppress one form of noise has generally not been found conducive to minimizing the other types of noise.

In a copending application of C. F. Quate, now United States Patent 2,974,252, issued March 7, 1961, there is disclosed a completely different approach to the problem of reducing the noise in a velocity modulation device. In that application it is shown that if certain conditions are met low noise exponential signal gain may be realized by modulating the electron beam in only the fast mode with radio-frequency power and also with a signal wave to be amplified, the signal wave being of a frequency less than the radio-frequency power.

When an electron beam is modulated with high frequency radio-frequency energy there are present on the beam two space charge waves which are propagated therealong. One of the space charge waves travels at a velocity less than the direct-current velocity of the beam and is generally referred to as the slow wave. The other space charge wave travels faster than the direct-current beam velocity and is referred to as the fast wave. Since the kinetic power in the beam in the presence of the slow wave is less than the direct-current power of the beam, in order to modulate the beam with slow space charge waves so as to produce conventional interaction and amplification, it is necessary to abstract radio-frequency power from the beam. The disadvantage in utilizing the slow wave is, therefore, that the noise on the beam propagating as a slow wave can never be completely eliminated as this would require that power be delivered to the beam at the exact frequency and proper phase to cancel the noise. In contrast, however, when the fast mode space charge wave propagates on the electron beam the kinetic power is greater than the direct-current power and thus, in order to excite the fast space charge wave, radio-frequency power must be delivered to the beam. As disclosed in the aforementioned Quate application, under such conditions, the fast mode noise content on the beam may be removed by simply abstracting the excess radio-frequency power representative of the noise in the fast mode wave of the beam. The beam may then be modulated in the fast mode with a signal to be amplified and with radio-frequency power at a frequency greater than the signal, and parametric gain of the signal is realized to the extent of the excess of kinetic power of the beam over and above the direct-current power.

In the Quate application there are disclosed devices which operate solely in the fast mode and produce at the output a substantially noise-free amplified signal. The circuit element utilized to abstract the fast mode noise content of the beam in these devices is a cavity resonator having two interaction gaps separated by a quarter plasma wavelength drift region. The circuit element utilized to modulate the beam with the signal to be amplified may be either a similar cavity resonator or a helix operated at the "Kompfner Dip" condition. Such a helix is disclosed more fully in an article, entitled "A Coupled Mode Description of the backward Wave Oscillator and the 'Kompfner Dip' Condition" by R. W. Gould, I.R.E. Transactions on Electron Devices, vol. ED-2, No. 4, October 1955, pages 37 through 42. Hereinafter, the expression "Kompfner Dip" will be used as a word of art in defining a helix with the characteristics described in the above-cited article and which will be discussed more fully below. Such circuits as the aforementioned may be visualized as a form of space charge wave conversion filter which impresses upon or abstracts from the beam energy in only the fast mode to the exclusion of the slow mode noise energy that may be present on the beam. Disadvantageously, both of these types of circuits present limitations on the operation of the device. The floating drift tube type of cavity resonator is inherently a narrow band device and thus is not operable over a wide band of frequencies. A helix operated at the "Kompfner Dip" by itself results in modulation of the beam to a slight extent in the slow mode as well as in the fast mode. The slow mode wave thus impressed upon the beam is amplified during the interaction process together with the original slow mode noise energy and acts to reduce the low noise signal gain that could be otherwise realized from fast mode operation. Even more significantly, however, is the fact that the presence of these slow mode amplified waves on the beam makes it exceedingly difficult, if not impossible with a "Kompfner Dip" helix by itself, to abstract only the substantially noise-free amplified fast mode wave energy from the beam, thereby reducing the noise figure of the device. In addition, a helix operated at the "Kompfner Dip" condition will not completely abstract all of the pure fast mode waves on the beam which further reduces the efficiency of the device when operating in only the fast mode.

Accordingly, it is an object of this invention substantially completely to eliminate the fast mode noise content of the electron beam in velocity modulation devices.

It is another object of this invention substantially completely to eliminate the fast mode noise content of the beam in such devices over a wide band of frequencies.

It is still another object of this invention to increase the efficiency, gain and noise figure obtainable in velocity modulation devices by eliminating the effect of the slow mode noise content of the beam on the amplified output signal of the device.

These and other objects of my invention are attained in a first illustrative embodiment thereof wherein an electron discharge device comprises an evacuated envelope with an electron gun and a collector at opposite ends for forming and projecting the electron beam along an extended path therebetween. A first space charge wave filter including a "Kompfner Dip" helix is positioned along the path of flow for transferring signal energy from the helix to the beam and for abstracting the fast mode noise content of the beam. Downstream of the first filter is positioned a floating drift tube type cavity resonator for modulating the electron beam with radio-frequency energy of a predetermined frequency. Downstream of the resonator and positioned along the path of flow is a second space charge wave filter including a "Kompfner Dip" helix for transforming amplified signal energy in the form of fast mode space charge waves on the beam into electromagnetic wave energy at the helix output, to the exclusion of the slow mode noise content of the beam.

In accordance with one aspect of my invention, each of the space charge wave filters comprises, in addition to the "Kompfner Dip" helix, two space charge wave conversion discontinuities established by abrupt changes in drift tube voltage a short distance from either end of the helix. As will be explained in greater detail hereinafter, by properly selecting the magnitude and placement of the discontinuities, an original fast mode wave may be converted into any desired ratio of fast mode to slow mode space charge waves on the beam, provided the amplitude of the fast mode wave is greater than that of the slow mode wave. I have found that where the fast mode energy in the beam is converted into a proper ratio of fast mode to slow mode waves, a "Kompfner Dip" helix will abstract substantially all of the energy thus converted. Accordingly, in the case where the helix is utilized to abstract energy from the beam, the space charge wave discontinuity before the helix converts the fast mode space charge waves on the beam into the proper ratio for substantially complete abstraction of the energy thus converted, and where the helix is utilized to modulate the beam, the discontinuity after the helix converts such modulations into pure fast mode waves.

In other illustrative embodiments of my invention, the space charge wave discontinuities are established by abrupt predetermined changes in drift tube diameter.

In accordance with an aspect of this invention in one of such embodiments, the space charge wave discontinuity preceding the helix utilized to abstract noise and modulate the beam with signal energy is followed by a drift tube section which tapers from a diameter maximum at the discontinuity to a diameter minimum at the start of the helix. Within this tapered section is situated a hollow, tapered dielectric sleeve having an inner diameter equal to the normal drift tube diameter and within which is positioned an extremely fine pitch helix. Such an arrangement serves to preserve the desired ratio of fast to slow mode waves created by the discontinuity while the drift tube diameter is transformed to the diameter of the helix, and further, effectively to magnify the discontinuity in a manner made more apparent hereinafter. In a like manner, the helix is followed by such a drift tube transformer section which tapers from the normal drift tube diameter up to a maximum diameter at the discontinuity.

In accordance with an aspect of another of such embodiments, the above-described tapered and uniform drift tube sections on opposite sides of the respective discontinuity regions are reversed.

In still another illustrative embodiment of my invention, each of the space charge wave filters comprises a "Kompfner Dip" helix from the respective ends of which is spaced a space charge wave discontinuity established by an abrupt change in the electron beam diameter. This change may be accomplished by varying the intensity of the longitudinal magnetic field in a predetermined manner by known methods. With the magnitude of the beam diameter change of a certain value and the longitudinal length from this change to the respective end of the helix of a certain predetermined length, the above-described filter characteristics will similarly be realized. As the filter discontinuities are designed to effect a predetermined type of mode conversion in the beam by altering certain of the electrical parameters thereof, it becomes readily apparent that the nature of the discontinuities with respect to the beam is electrical.

Accordingly, it is a feature of this invention to convert the fast mode space charge waves on the beam into a predetermined ratio of fast to slow mode waves which will permit complete abstraction of the original fast mode wave energy by a helix operated in the "Kompfner Dip" condition.

It is another feature of this invention to convert the fast and slow mode modulations applied to the beam by a "Kompfner Dip" helix completely to fast mode space charge energy on the beam.

It is still another feature of this invention to abstract from the beam amplified fast mode wave energy by converting this energy into a predetermined ratio of fast to slow mode energy and thereafter abstracting the energy with a "Kompfner Dip" helix.

It is a further feature of this invention that a "Kompfner Dip" beam coupler be preceded at a specific distance by means producing a discontinuity to the beam and be followed at a specified distance by means producing a discontinuity to the beam to attain the above-mentioned mode conversions. In accordance with this specific feature of my invention and in various embodiments thereof the discontinuity seen by the beam may be due to a voltage jump or drop, a change in the magnetic focusing field, a change in the dielectric constant of the material adjacent the beam, or a change in the diameter of a tube encompassing the beam.

A complete understanding of this invention and of these and other features thereof may be gained from consideration of the following detailed description taken in conjunction with the accompanying drawing, in which.

Figure 1:
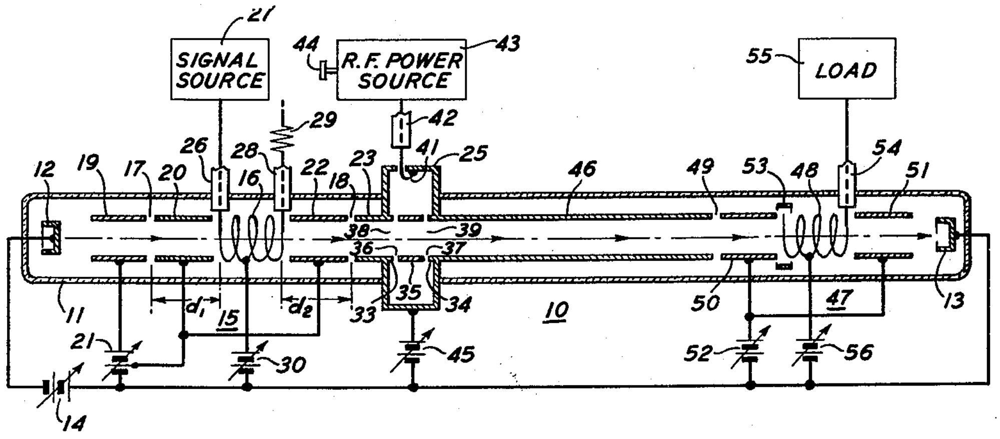
FIG. 1 is a schematic view of one illustrative embodiment of this invention.

Referring now to FIG. 1, there is depicted schematically a velocity modulation type device 10 embodying the principles of this invention. Positioned within and at opposite ends of an evacuated envelope 11, which, for example, may be of glass or any other suitable material, is an electron gun 12 for projecting an electron beam along an extended path to a collector 13. The electron gun 12 is shown schematically and will in practice generally comprise an electron emissive cathode surface, a heater assembly, intensity control electrode, and beam forming and accelerating electrodes. For convenience and simplicity, these elements have been omitted from this and other figures to follow. The collector 13 is maintained at a suitable positive potential with respect to the electron emissive cathode of the gun 12 by means of suitable lead-in connections from an adjustable voltage source 14. Located along the path of flow at a point downstream with respect to the electron gun 12 is a first space charge wave filter 15, which, in accordance with principles of this invention, comprises a "Kompfner Dip" helix 16 and two space charge wave discontinuity regions 17 and 18 spaced a short distance from the respective ends of helix 16. The exact spacing of these discontinuity regions as well as their wave conversion magnitude will be discussed in greater detail hereinafter. In describing the relative position of the circuit elements along the path of flow hereinafter, the term upstream will be used to signify a closer proximity to the electron gun 12 than the collector 13 whereas the term downstream will signify the converse. The first space charge wave discontinuity region 17 comprises two conductive drift tube sections 19 and 20, the adjacent ends of which are separated by a short gap defining the discontinuity region 17. Drift tube section 19 is biased more positively than drift tube section 20, as shown by the respective connections to the multi-tapped variable voltage source 21 and thus, a velocity drop is established across discontinuity region 17. However, as will become more apparent hereinafter, either a velocity drop or a velocity jump may be utilized at any of the discontinuity regions of this embodiment. It is to be understood that bias may be applied to the various circuit elements in this as well as the following embodiments independently or from a single variable source by any of the known means, a tapped variable battery source being here shown merely for convenience and simplicity. Wave discontinuity region 18 is likewise established by two drift tube sections 22 and 23 with a potential difference constituting a velocity jump being established therebetween. This permits the magnitude and spacing of the discontinuity regions on either side of the filter helices to be symmetrical as will become more apparent hereinafter. It is to be understood, however, that two voltage drops or jumps could also be utilized with equal effectiveness, such an arrangement similarly being discussed in greater detail hereinafter. Drift tube section 23 may comprise a separate conductive drift tube section or form a portion of a cavity resonator 25 as shown.

As previously mentioned, helix 16 is operated at the "Kompfner Dip" condition and has applied thereto through a suitable transmission line 26 signal energy to be amplified from a source 27. In accordance with the principles of this invention, all of the original fast mode noise content of the beam is abstracted at the downstream or output end of helix 16 through a suitable transmission line 28 and absorbed in a dissipative member, such as the resistance element 29 shown herein. While it is desired that helix 16 be at approximately the same potential as drift tube sections 20 and 22, a separate variable voltage source 30 is connected to helix 16 to act as a trimmer in order that the coupling between the fast mode of the electron beam and signal wave energy applied to helix 16 may be optimized during operation of the device in a manner independent of the other circuit elements.

The circuit elements thus far described along the path of flow between and including the drift tube sections 19 and 23 constitute the first beam wave filter 15 of this embodiment, the significance and operating characteristics of which will be described in greater detail hereinafter. Positioned along the path of flow and on the downstream side of discontinuity region 18, and separated therefrom by the drift tube section 23, is the cavity resonator 25 through which pumping power is applied to the beam in only the fast mode. As disclosed in the aforementioned Quate application, by properly relating the frequency of the radio-frequency pump energy and signal energy, exponential amplification of the signal wave may be achieved at the expense of the pump wave in only the fast mode. The resonator 25 preferably is of highly conductive material and may, as shown in FIG. 1, as well in the figures to follow, be incorporated into the elongated envelope 11 as a part thereof or may be mounted externally or internally of the envelope in a manner well known in the art. Resonator 25 is provided with a first hollow reentrant portion 33 open at both ends and a second hollow reentrant portion 34 also open at both ends. Between the interior ends of the two reentrant portions is located a hollow conductive member 35 defining a drift space of preferably one-quarter plasma wavelength within the resonator. The interior ends of reentrant portion 33 and one end of drift tube member 35 are in close proximity to each other, thereby defining a narrow gap 36 past which the electron beam is projected. The interior end of reentrant portion 34 and the end of member 35 adjacent thereto are likewise in close proximity and define a narrow gap 37 past which the electron beam is projected.

Opposite the interior ends of reentrant portions 33 and 34 are apertures 38 and 39 in opposite walls of the resonator 25. The apertures are axially aligned with the reentrant portions and coincide with the uniform diameter drift tube section 23 which may, as shown herein, form a flanged portion of the resonator wall. It is to be understood that while cavity resonator 25 has here been shown as comprising reentrant portions for defining the narrow gaps, other suitable geometric configurations might be used and the arrangement here shown for resonator 25 as well as for the resonators to be shown in the embodiments hereinafter is intended merely to be by way of illustration. An input coupling loop 41 is connected through a suitable transmission line 42 to a radio-frequency power source 43, which is provided with an adjusting member 44 for varying the phase of power which is delivered from source 43 to resonator 25 if such a resonator is operated at a frequency exactly twice the signal frequency. It is to be understood, however, that the fast mode space charge wave filters disclosed in this invention are equally effective and operate in a manner independent of the specific frequency relationship relied upon between the signal and pump frequencies for parametric amplification. Accordingly, the space charge wave filters of this invention are equally suitable in a fast mode velocity modulation type device utilizing a pump frequency less than the signal frequency, such as disclosed in a copending application of this inventor, Serial No. 736,639, filed May 20, 1958. A separate variable voltage source 45 is connected to cavity resonator 25 which permits adjustment of the voltage applied thereto in a manner independent of the other circuit elements. It is to be understood of course that the conductive drift tube member 35 could be biased by a separate variable voltage source, not here shown, which would permit optimizing of the transit time of the electrons passing interaction gaps 36 and 37. The specific function, dimensions and significant characteristics realized with such a double gap cavity resonator are set forth in detail in the aforementioned Quate application.

Further downstream along the path of flow with respect to cavity resonator 25 and separated therefrom by a long uniform diameter drift tube section 46 is a second space charge wave filter 47. Filter 47 is quite similar to filter 15 and comprises a "Kompfner Dip" helix 48 from the upstream end of which is spaced a wave discontinuity region 49. This discontinuity region is established by a potential difference between adjacent ends of conductive drift tube section 46 and a much shorter drift tube section 50, the length of which will be considered in greater detail hereinafter. Drift tube section 50 as well as a short drift tube section 51 positioned on the downstream side of helix 48 and through which the beam passes before collection are connected to a variable voltage source 52. Voltage source 52, by way of example, may be at a less positive potential than source 45, and thus, the discontinuity region 49 constitutes a velocity drop. However, as previously mentioned, either a velocity drop or a velocity jump may be utilized in accordance with the principles of this invention. Helix 48 is terminated to be substantially reflectionless at the upstream end, such as by a lossy ring 53 shown surrounding the helix. The exponentially amplified fast mode signal energy is abstracted from the downstream end of helix 48 through a suitable transmission line 54 to an output load 55 for utilization. While it is desired that helix 48 be at the same potential as drift tube sections 50 and 51, a separate variable voltage source 56 is connected to helix 48 so as to act as a trimmer for optimizing the coupling between the fast mode of the electron beam and the electromagnetic wave energy propagating along helix 48 during operation.

In general, such a device, as well as those which follow, is provided with a magnetic focusing structure or other suitable means, not here shown, for focusing the electron beam throughout its travel along the path of flow, and which may comprise any one of a number of such arrangements well known in the art.

Before describing the operation of the device 10, a brief description of the function, characteristics and significance of the space charge wave filters and an analysis thereof in accordance with the principles of this invention will be considered.

Space charge waves propagate on an electron beam in much the same manner as electromagnetic waves propagate on a conductive transmission line. The fast wave on the beam is analogous to the forward wave and the slow wave to the reflected wave on a typical transmission line. As will now be shown, by properly selecting the magnitude of a space charge wave discontinuity region, in accordance with the invention, an original fast mode space charge wave on the beam may be converted into any desired ratio of fast to slow mode space charge waves in passing through the discontinuity, provided the fast wave amplitude is greater than the slow wave amplitude. Similarly, with both fast and slow mode space charge waves impressed upon the beam, but with the amplitude of the fast mode waves being greater than the slow, a discontinuity region of the proper magnitude and positioned at a point where the fast and slow mode waves are either in phase, or 180° out of phase, will result in a pure fast mode wave being established on the beam after passing through the discontinuity. Advantageously, a "Kompfner Dip" helix satisfies the condition that the fast mode wave be of greater amplitude. Moreover, radio-frequency signal energy applied at the input of such a helix is completely converted into both fast and slow mode space charge wave energy; in other words, there is no signal energy at the helix output. It has also been found that with a proper ratio of fast to slow mode waves on the beam at the input of such a helix, with the fast mode waves being of greater amplitude than the slow mode waves, all of the power will appear at the output of the helix.

For purposes of analyzing the characteristics of and design considerations for a filter in accordance with the principles of this invention, the following discussion will be directed to a filter comprising a short lossless helix operated at the "Kompfner Dip" condition which, for convenience of explanation, is preceded by a velocity drop and followed by a velocity jump. The anaylsis, however, is general, and applicable to all of the techniques and structural arrangements disclosed herein for establishing space charge wave discontinuities or changes in wave impedance.

Figure 3:
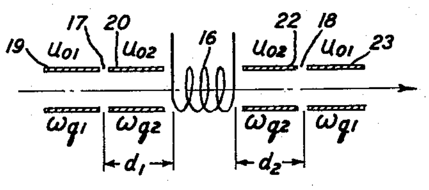
FIG. 3 is a schematic view of one illustrative space charge wave filter embodying the principles of this invention with certain of the design parameters designated thereon for the purpose of better understanding the design analysis directed thereto.

In a velocity jump (or drop) occurring in a distance short compared to a space charge wavelength there are two conditions which quite accurately describe the jump. First the radio-frequency current across the jump is continuous since it occurs in such a short length that the current cannot change. Secondly, if the energy in the beam is to be conserved, the ratio of the radio-frequency velocities of the beam must be in the ratio of the direct-current velocities of the beam. We may then express these conditions as follows $$v_2=\frac{u_{01}}{u_{02}}v_1 \qquad (1)$$

$$i_2=i_1 \qquad (2)$$

where, as seen in FIG. 3, the subscript 2 denotes the output side of the first wave discontinuity region and the subscript 1 indicates the input side and where $v$ is the radio-frequency velocity of the beam
$u_0$ is the direct-current velocity of the beam, and
$i$ is the radio-frequency beam current.

In terms of fast and slow mode space charge waves we can write $$i^1=i_{f_1}+i_{s_1} \qquad (3)$$

and $$i_2=i_{f_2}+i_{s_2} \qquad (4)$$

where $i_f$ is the fast space charge wave, and
$i_s$ is the slow space charge wave.

Similarly:

$$v_1=v_{f_1}+v_{s_1} \qquad (5)$$

$$v_2=v_{f_2}+v_{s_2} \qquad (6)$$

where the relation between the velocity and current in these waves can be given, as derived from Poisson's equation, the equation of continuity, and the equation of motion by the following expression $$v_f=-\frac{u_{01}}{I_0}\frac{\omega_{q1}}{\omega}i_{\text{fast}} \qquad (7)$$

$$v_s=+\frac{u_{01}}{I_0}\frac{\omega_{q1}}{\omega}i_{\text{slow}} \qquad (8)$$

where $I_0$ is the direct-current of the beam
$\omega_{q1}$ is the reduced plasma frequency for a cylindrical beam on the input side of the first discontinuity region, and
$\omega$ is the signal frequency.

We can rewrite Equations 1 and 2 in terms of the corresponding fast and slow mode space charge waves using Equations 7 and 8. Thus $$i_{f_2}+i_{s_2}=i_{f_1}+i_{s_1} \qquad (9)$$

and $$-\frac{u_{02}}{I_0}\frac{\omega_{q2}}{\omega}i_{f_2}+\frac{u_{02}}{I_0}\frac{\omega_{q2}}{\omega}i_{s_2}=\frac{u_{01}}{u_{02}}\left(-\frac{u_{01}}{I_0}\frac{\omega_{q1}}{\omega}i_{f_1}+\frac{u_{01}}{I_0}\frac{\omega_{q1}}{\omega}i_{s_1}\right) \qquad (10)$$

Rewriting Equation 10 gives the relation $$-i_{f_2}+i_{s_2}=\frac{u_{01}^2}{u_{02}^2}\frac{\omega_{q1}}{\omega_{q2}}(-i_{f_1}+i_{s_1}) \qquad (11)$$

Adding and subtracting Equations 9 and 11 gives $$i_{f_2}=\frac{1}{2}\left[i_{f_1}\frac{u_{01}^2}{u_{02}^2}\frac{\omega_{q1}}{\omega_{q2}}+i_{s_1}\left(1-\frac{u_{01}^2}{u_{02}^2}\frac{\omega_{q1}}{\omega_{q2}}\right)\right] \qquad (12)$$

$$i_{s_2}=\frac{1}{2}\left[i_{f_1}\left(1-\frac{u_{01}^2}{u_{02}^2}\frac{\omega_{q1}}{\omega_{q2}}\right)+i_{s_1}\left(1+\frac{u_{01}^2}{u_{02}^2}\frac{\omega_{q1}}{\omega_{q2}}\right)\right] \qquad (13)$$

In accordance with the principles of this invention, the condition is desired at which $i_{s_2}$, the slow signal wave component at the output of the second discontinuity of the first space charge wave filter, can be made equal to zero, as pure fast mode signal waves are desired for exponential amplification. Setting $i_{s_2}=0$, gives:

$$\frac{\left(1+\frac{u_{01}^2}{u_{02}^2}\frac{\omega_{q1}}{\omega_{q2}}\right)}{\left(1-\frac{u_{01}^2}{u_{02}^2}\frac{\omega_{q1}}{\omega_{q2}}\right)}=-\frac{i_{f_1}}{i_{s_1}} \qquad (14)$$

or $$\frac{u_{01}^2}{u_{02}^2}\frac{\omega_{q1}}{\omega_{q2}}=\frac{\frac{i_{f_1}}{i_{s_1}}+1}{\frac{i_{f_1}}{i_{s_1}}-1} \qquad (15)$$

where $\omega_{q2}$ is the reduced plasma frequency for a cylindrical beam at the output side of the first discontinuity region.

Equation 15 is easily satisfied if $i_{f_1}/i_{s_1}>1$. The condition that $i_{f_1}>i_{s_1}$ can be understood from an energy standpoint by the fact that to remove the slow wave from the beam requires the addition of energy which must come from the fast wave.

It should be noted that the above conditions desired are directed specifically to matching the fast and slow mode wave energy from the original fast mode wave to the characteristics of the helix for abstraction at the output thereof. This matching is accomplished by obtaining the proper ratio and magnitude of fast to slow waves. Similarly, the conditions desired for converting the fast and slow mode signal waves excited on the beam by the "Kompfner Dip" helix into pure fast mode wave energy is dependent upon the same requirements as to the ratio and magnitude of the waves so excited. Accordingly, the original slow mode noise energy similarly converted into components of both fast and slow mode noise energy are neither of the proper ratio nor of the proper magnitude to be abstracted either at the helix output or to be converted into a pure fast wave. That this slow mode noise energy remains on the beam substantially unaffected can be verified by a complex analysis similar to that which was specifically undertaken for the fast mode symmetrical conditions described herein. Inasmuch as the original slow mode noise energy in passing through the first discontinuity region is converted back into slow mode noise wave energy in passing through the second discontinuity region of the first wave filter, this noise will be described hereinafter simply as the slow mode noise energy on the beam.

The left side of Equation 15 can be rewritten in a more tractable form to show the various ways in which the wave discontinuities may be established as follows:

$$\frac{u_{01}^2}{u_{02}^2}\frac{\omega_{q1}}{\omega_{q2}}=\frac{R_1}{R_2}\left(\frac{V_1}{V_2}\right)^{3/4}\frac{a_2}{a_1}\left(\frac{\epsilon_2}{\epsilon_1}\right)^{1/2} \qquad (16)$$

where, on the respective sides of each discontinuity $R_1$ and $R_2$ are the plasma frequency reduction factors
$V_1$ and $V_2$ are the direct-current drift tube voltages
$a_1$ and $a_2$ are the beam diameters, and
$\epsilon_1$ and $\epsilon_2$ are the effective dielectric constants.

The reduction factors are a function of the drift tube diameters on opposite sides of each discontinuity as well as of the above-defined coefficients in an interrelated manner.

It can thus be seen from Equation 16 that a space charge wave discontinuity can be established in a number of ways, by varying certain parameters independently or in combination.

Figure 2:
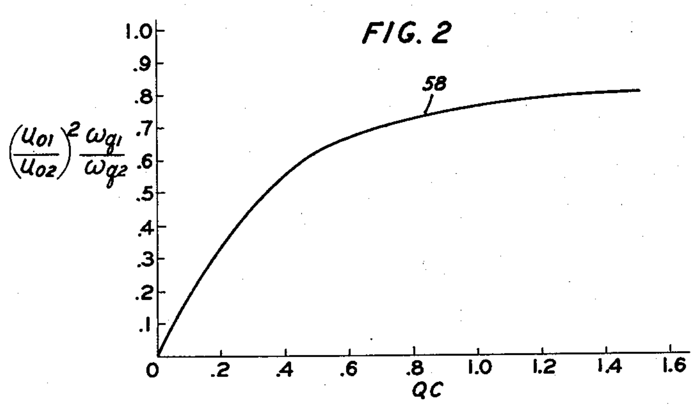
FIG. 2 is a graphic representation of a design curve for determining the magnitude of the space charge wave discontinuities required in accordance with the principles of this invention.

Moreover, the ratio of fast to slow mode waves may be controlled by adjusting the position and magnitude of the wave discontinuities. However, matching the converted space charge waves by such a discontinuity to the precise wave conversion characteristics of a "Kompfner Dip" helix having a given space charge parameter QC necessitates an exhaustive theoretical analysis. Such an analysis has been undertaken wherein the electron beam and helix were represented by a coupled network, with the coefficients thus derived being expressed, in the case of a short helix, by a complex power series analysis. The information thus derived from such an analysis for the case of symmetrical filter conditions, in accordance with the principles of this invention, has been evaluated versus a series of space charge parameters QC. This information is plotted in FIG. 2 wherein the design curve 58 is defined by the ratio of the magnitude of the discontinuity required either to convert a pure fast mode wave into the proper ratio of fast to slow mode waves or vice versa, as defined by Equation 16, plotted along the ordinate versus a continuous series of space charge parameters QC for a helix operated at the "Kompfner Dip" condition plotted along the abscissa. Accordingly, the magnitude of the space charge wave discontinuities utilized in the filter arrangements described herein may readily be computed for any "Kompfner Dip" helix with a given space charge parameter QC from the design curve 58 of FIG. 2. By way of example, and for purposes of illustration only, given a "Kompfner Dip" helix having a space charge parameter $QC=.8$, it is seen that the magnitude of the space charge wave discontinuity defined by the relation $$\frac{u_{01}^2}{u_{02}^2}\frac{\omega_{q1}}{\omega_{q2}}$$

must equal approximately .73. If the wave discontinuity region is established by either velocity jumps or drops each of the coefficients defining the ordinate of the curve of FIG. 2 is readily ascertained and pictorially illustrated in FIG. 3. Of course, the wave discontinuities may be readily ascertained and established with equal effectiveness by changing circuit parameters such as the drift tube diameter, beam diameter or effective dielectric constant as evidenced by Equation 15.

Figure 4:
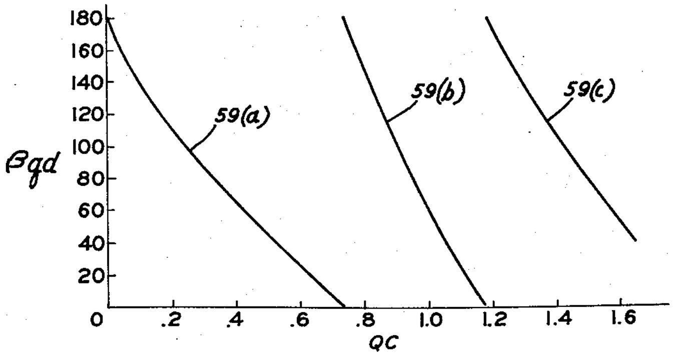
FIG. 4 is a graphic representation of a design curve for determining the proper location of the wave discontinuity regions in accordance with the principles of this invention.

Having determined the correct magnitude of the wave discontinuities required in the space charge wave filters described herein, there still remains the point along the path of flow at which the discontinuities are spaced from the respective ends of the helix in each of the filters. FIG. 4 depicts a design curve 59 broken into 180 degree segments which shows the distance required between each of the discontinuities and the end of the helix adjacent thereto for the symmetrical filter case. The distance is plotted in terms of the product $\beta_q d$ plotted along the ordinate versus a continuous series of space charge parameters QC plotted along the abscissa. Inasmuch as $\beta_q$, the plasma phase constant of the beam in the drift regions on either side of the respective helices, is easily determined from the known beam constants, the distance $d$, measured in radians is likewise readily ascertainable. This distance $d$ is specifically illustrated in both FIGS. 1 and 3.

It should be noted that when the discontinuity regions are established by changes in drift tube voltage, either a velocity jump $u_{02}>u_{01}$ or a velocity drop $u_{02}<u_{01}$ may be utilized. These two points are spaced apart by a quarter space charge wavelength on the respective sides of the discontinuity. It is also significant to note that the parameters which determine the magnitude and spacing of the discontinuities, such as those established by the filter arrangement depicted in FIGS. 1 and 3, as well as those which follow, may be either symmetrical or asymmetrical. More particularly, and by way of example, in the case of drift tube voltage changes, where the input velocity drop across the first discontinuity region 17 is equal to the output jump across the second discontinuity region 18, the length of drift tubes 20 and 22 are equal. However, if both discontinuity regions are established by velocity jumps or drops, neither the drift tube lengths nor the potentials which establish them will be equal. Under these conditions, the length of one drift tube section will differ from the other by a one-quarter plasma space charge wavelength and the difference in magnitude between the discontinuity regions would have to be determined by a theoretical analysis similar to that described above for the symmetrical case.

Having analyzed the space charge wave filter characteristics desired and the design considerations for such a filter, in accordance with the principles of this invention, the manner of operation involved in the device 10 depicted in FIG. 1 will now be described. An electron beam is formed and projected along a rectilinear path from the electron gun 12 to the collector 13. As is known, such a beam is characterized by the presence of both fast and slow mode noise waves thereon. In passing the first space charge wave discontinuity region 17, constituting a velocity drop of the proper magnitude and placement, as determined from the design curves depicted in FIGS. 2 and 4, the original fast mode wave noise energy is converted into the proper ratio of fast to slow mode noise waves, with the fast being of greater amplitude as required to assure complete abstraction of this noise energy at the output of helix 16 for dissipation in the resistive member 29. Radio-frequency signal energy to be exponentially amplified in only the fast mode is applied to the input of helix 16. Since it is known that with a "Kompfner Dip" helix, no signal energy appears at the helix output, all of the signal energy is utilized in exciting fast, and to a lesser extent, slow mode space charge signal waves on the electron beam. As determined from the design curves depicted in FIGS. 2 and 4, the second wave discontinuity region 18, being of the proper magnitude and location, converts all of the signal energy appearing in both the fast and slow mode waves into pure fast mode signal energy at the output of the discontinuity region 18. While the original slow mode noise energy on the beam is similarly converted into fast and slow mode space charge waves in passing through the first discontinuity region 17, neither the ratio nor the magnitude of these waves are such as to satisfy the specific helix requirements for abstraction at the output thereof. Thus, the fast and slow mode noise waves representative of the original slow mode noise energy effectively remain substantially unaffected on the beam and are converted back to slow mode noise energy in passing through the second discontinuity region 18 at the output of the composite filter 15. The beam then passes through the cavity resonator 25, which is made resonant at a frequency which may be either higher or lower than the signal frequency to be exponentially amplified in the fast mode. As disclosed in detail in the aforementioned Quate application, the beam may, for example be modulated with radio-frequency pump energy at a frequency higher than the signal frequency from the source 43 so that when the beam emerges from cavity resonator 25 it has impressed thereon, in addition to the signal energy in the form of fast mode velocity modulations, radio-frequency pump energy in the form of velocity modulations over and above the energy of the beam prior to its entry into cavity resonator 25. In passing along the extended drift region 46, the signal and pump velocity modulations are converted into density modulations and interact in a manner as disclosed in the Quate application whereby the signal energy in the form of a fast mode space charge wave grows exponentially at the expense of the energy in the fast mode space charge pump wave. The beam then passes through the second beam wave filter 47 wherein the space charge wave discontinuity region 49 preceding the helix converts the fast mode exponentially amplified signal energy into the proper ratio and magnitude of fast to slow mode space charge wave energy, as determined from the design curves of FIGS. 2 and 4, which will assure complete abstraction of the signal energy at the output of helix 48 through the transmission line 54 for utilization in the load 55. As previously mentioned in regard to filter 15, the slow mode noise energy similarly converted into components of both fast and slow mode noise wave energy in passing through discontinuity region 49 remains substantially unaffected on the beam in passing through the filter 47 inasmuch as the waves so converted are neither of the proper ratio nor magnitude required for abstraction at the output of helix 48.

The beam wave filters in combination in this embodiment as well as those which follow are thus designed to satisfy the following conditions:

(1) Signal energy applied at the helix (filter circuit) input of the first filter appears only in the form of fast mode signal wave energy on the beam at the filter output;

(2) Noise or signal energy put into either the first or second filter as fast mode wave energy on the beam appears only as electromagnetic wave energy at the helix (filter circuit) output; and (3) Noise energy put into the first filter as slow mode wave energy on the beam appears only as a slow mode unamplified noise wave at the filter output.

Figure 5:
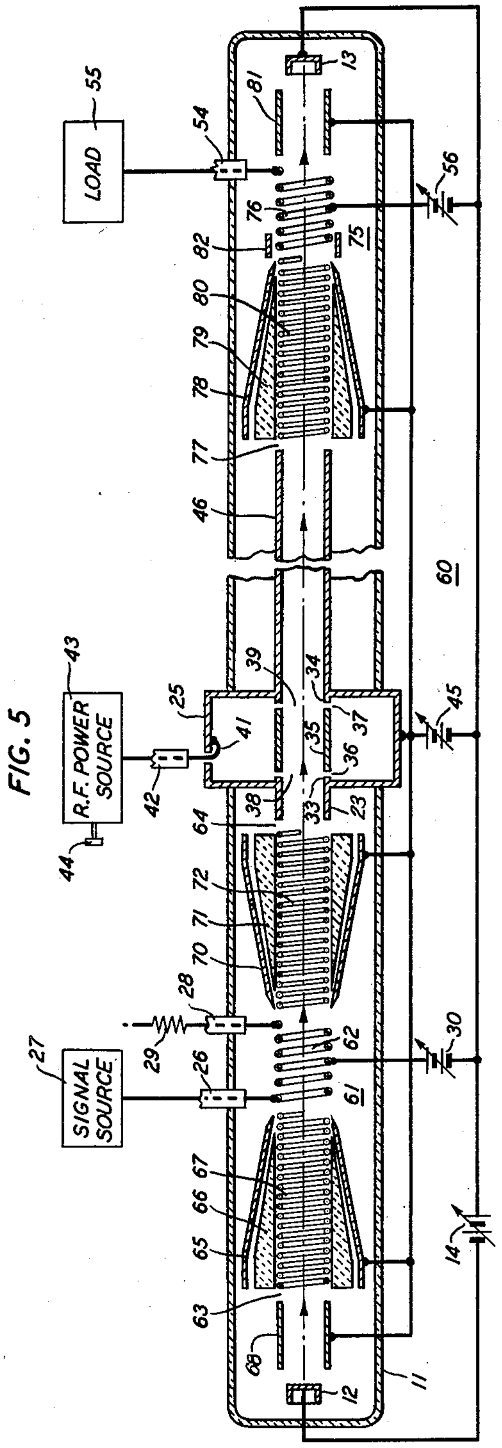
FIG. 5 is a schematic view of another illustrative embodiment of this invention.

FIG. 5 depicts schematically a velocity modulation type device 60 embodying the principles of this invention. Certain of the circuit elements which are similar to those appearing in device 10 of FIG. 1 will be designated by corresponding reference numerals. The first space charge wave filter 61, in accordance with the principles of this invention, comprises a "Kompfner Dip" helix 62 and two space charge wave discontinuity regions 63 and 64 spaced a short distance from the respective ends of helix 62, as determined from the design curve of FIG. 4.

The first space charge wave discontinuity region 63 comprises two conductive drift tube sections 68 and 65, the former being of uniform diameter and the latter tapering from a diameter maximum at the discontinuity region 63 to a diameter minimum adjacent the upstream end of the helix 62. As recalled from Equation 16, changing the drift tube diameter effectively changes the ratio of the plasma frequency reduction factors $R_1/R_2$ which permits the proper magnitude of the discontinuity to be established. By tapering the drift tube section 65 gradually, the desired ratio of fast to slow mode space charge waves may be retained in passing through drift tube section 65 before entering helix 62.

Advantageously, a tapered dielectric sleeve 66 having an inner diameter equal to the normal drift tube or helix diameter is positioned within the tapered drift tube section 65. As also seen from Equation 16, by changing the ratio of the dielectric constants $$\frac{\epsilon_2}{\epsilon_1}$$

on opposite sides of the discontinuity in the proper way, the magnitude of the discontinuity may be increased further than would otherwise be possible with only a change in the drift tube diameter. Thus, in essence, the dielectric sleeve 66 presents to the beam what appears to be a drift tube diameter discontinuity of substantially greater magnitude than is actually present. In order to prevent the inner surface of the dielectric sleeve 66 from becoming charged by stray impinging electrons, which would cause defocusing of the electron beam, an extremely fine pitch helix 67, which appears transparent to the electron beam within the operating range of frequencies desired, is positioned along the inner wall of the dielectric sleeve 66. Helix 67, as well as the others to be described which are similar to it has been enlarged in the drawing in proportion to the size of the "Kompfner Dip" helices for better illustration.

The space charge wave discontinuity region 64, spaced from the downstream end of helix 62, similarly comprises on one side, a tapered conductive drift tube section 70 within which are successively positioned a tapered dielectric sleeve 71 of a uniform inner diameter and an extremely fine pitch helix 72. On the opposite side of the discontinuity region 64 is a short uniform drift tube section 23 which may, as in FIG. 1, form a part of the wall of the cavity resonator 25 as shown. Positioned along the path of flow downstream of cavity resonator 25 and separated therefrom by the drift tube 46, is a second space charge wave filter 75 embodying the principles of this invention. Filter 75 is quite similar to the composite filter 61 and comprises a "Kompfner Dip" helix 76 from the input end of which is spaced a wave discontinuity region 77. Discontinuity region 77 is established by the abrupt change in drift tube diameters of adjacent ends of drift tube sections 46 and 78, the latter tapering from a diameter maximum adjacent the discontinuity region 77 to a diameter minimum at the downstream end adjacent the helix 76. A tapered dielectric sleeve 79 of a uniform inner diameter and a fine pitch helix 80 are successively positioned axially within the tapered drift tube section 78. Adjacent the downstream end of helix 76 is a uniform diameter drift tube section 81 through which the beam passes before reaching the collector 13. Helix 76 is terminated to be substantially reflectionless at the upstream end, such as by a lossy ring 82 shown surrounding the helix. In contrast to the velocity jumps or drops desired between certain of the drift tube sections in the device 10 of FIG. 1, all of the drift tube sections in the device 60 of FIG. 5 preferably are at the same potential, as shown by the connections to the variable voltage source 45. Separate variable voltage sources 30 and 56 are connected to helices 62 and 76, respectively, to act as trimmers in order that the coupling between the fast mode of the electron beam and the electromagnetic wave energy propagating along helices 62 and 76 may be optimized in a manner independent of the other circuit elements.

In operation, the drift tube diameter discontinuity regions 63 and 64 of beam wave filter 61 and discontinuity region 77 of beam wave filter 75 are initially adjusted to be of the proper magnitude and at the proper location, as determined from the design curves depicted in FIGS. 2 and 4. Then either the original fast mode noise content of the beam in passing through the first space charge wave filter or the exponentially amplified fast mode signal energy in passing through the second wave filter will be converted into just the correct ratio of fast to slow mode space charge waves which will cause the energy representative thereof to feed into the respective helix or filter circuit outputs for dissipation or utilization. Correspondingly, the original signal energy applied to the input of helix 62 of the first beam wave filter 61 is completely converted into both fast and slow mode space charge waves which will be converted in passing through discontinuity region 64 into pure fast mode signal wave energy for exponential amplification. As in the case with the space charge wave filters depicted in FIG. 1, filters 61 and 75 of FIG. 5 effectively exclude the original slow mode noise energy on the beam which remains unamplified in reaching the collector 13.

Figure 6:
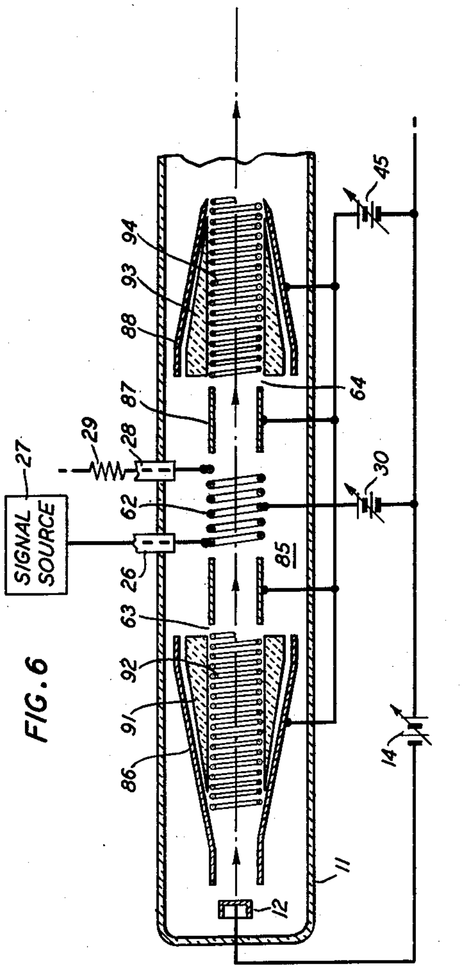
FIG. 6 is a modification of the illustrative embodiment of FIG. 5.

FIG. 6 depicts in a partial schematic view a modification of the first space charge wave filter 61 shown in FIG. 5. The second filter is not shown in FIG. 6 as it is modified in the same manner as the first filter with the exception of having only one discontinuity region corresponding to the second filter 75 of FIG. 5. Certain of the elements appearing in FIG. 6 which correspond to those of FIG. 5 are designated by the same reference numerals. The basic difference in the respective filters depicted in FIGS. 5 and 6 resides in the fact that the first discontinuity region 63 of filter 85 in FIG. 6 is preceded by a tapered drift tube section 86 which has a diameter maximum adjacent the upstream side of discontinuity region 63 rather than a drift tube of uniform minimum diameter. Similarly, the drift tube section 87 following the helix 62 is of a uniform diameter with the tapered drift tube section 88 tapering from a diameter maximum adjacent the downstream side of the second discontinuity region 64 to a diameter minimum.

In all other respects, the filter circuit elements and the operating characteristics of the filter are the same as those described with respect to the space charge wave filters depicted in FIG. 5.

Figure 7:
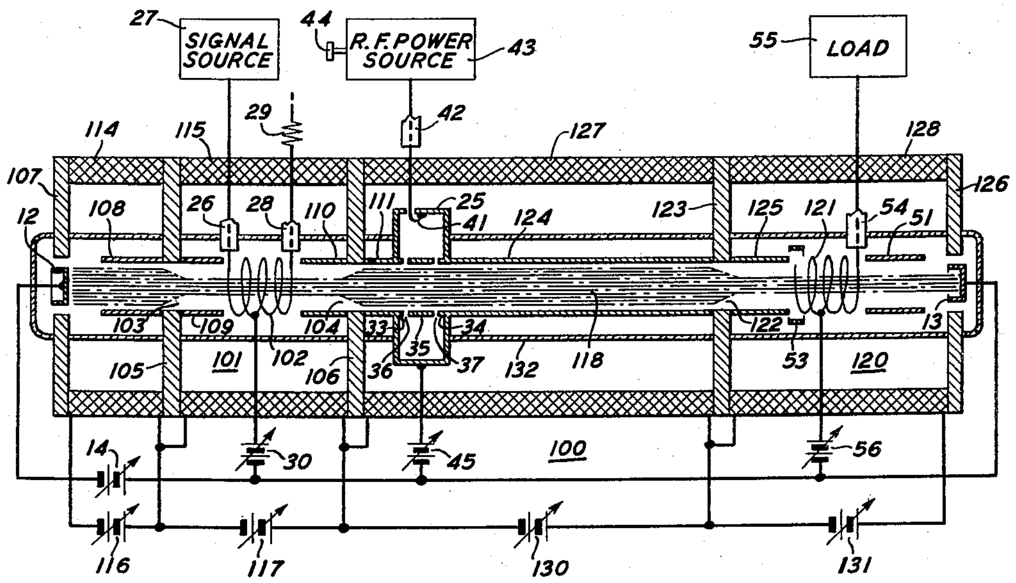
FIG. 7 is a schematic view of still another illustrative embodiment of this invention.

FIG. 7 depicts schematically another velocity modulation type device 100 embodying the principles of this invention. For convenience, certain of the elements which correspond to those appearing in device 10 of FIGS. 1 and 5 will be identified by the same reference numerals. A first space charge wave filter 101 comprises a "Kompfner Dip" helix 102 from opposite ends of which are spaced two space charge wave discontinuity regions 103 and 104. These discontinuity regions are established by a magnetic structural arrangement including pole-piece members 105 and 106, which, together with pole-piece member 107, define the lengths and termination points of two longitudinal magnetic focusing field regions. Pole-piece members 105 and 106 extend radially inward and have central apertures which coincide with the inner peripheries of drift tube sections 108, 109, 110, and 111. The magnetic field segments are established by solenoids 114 and 115 which bridge the gaps between pole-piece members 107 and 105, and 105 and 106, respectively. Variable potential sources 116 and 117 are shown connected to solenoids 114 and 115, respectively, in a manner which permits the current through the windings of these solenoids, and correspondingly, the magnetic field intensity in each field region, to be varied independently of one another. Accordingly, the proper magnitude of the wave conversion discontinuities of filter 101 may be obtained, as determined from the design curve depicted in FIG. 4, by an abrupt change in beam diameter as illustrated by the shaded area 118 which represents the electron beam in FIG. 7. The effect of changing the beam diameter is clearly evidenced from the coefficients $$\frac{a_2}{a_1}$$

appearing in Equation 16.

The second space charge wave filter 120 similarly comprises a "Kompfner Dip" helix 121 from the upstream end of which is positioned a space charge wave discontinuity region 122. This discontinuity region is formed by a structural arrangement including an annular magnetic pole-piece member 123 which extends radially inward and has a central aperture coinciding with the inner peripheries of drift tube sections 124 and 125. Pole-piece member 123 together with pole-piece member 106, a pole-piece member 126 and two solenoid sections 127 and 128, establish two magnetic field regions which change the electron beam diameter at the discontinuity region 122. The magnitude of the discontinuity is controlled by the variable potential sources 130 and 131 connected to the windings of solenoids 127 and 128, respectively. While solenoids have been illustrated as establishing the desired longitudinal magnetic focusing field regions, it is to be understood that various other magnetic focusing structural arrangements may be utilized, such as permanent magnets of the appropriate size bridging the adjacent pole-piece members depicted in FIG. 7. It is also to be understood that the plurality of drift tube sections instead of abutting the pole-piece members, as shown, may be made to form one or more continuous drift tube sections of which the pole-piece members would surround. An evacuated envelope 132, preferably of glass or any other suitable nonmagnetic material, is shown as enclosing the various circuit elements. In operation, filter circuits 101 and 120 exhibit the same characteristics as described above in regard to the embodiments depicted in FIGS. 1, 5, and 6.

It is to be understood that the specific embodiments described are merely illustrative of the general principles of this invention. Various other structural arrangements and modifications may be devised in the light of this disclosure by one skilled in the art without departing from the spirit and scope of this invention.

What is claimed is:

1. A high frequency electron discharge device comprising means for forming and projecting an electron beam along an extended path, said beam being characterized by the presence of both fast and slow mode noise waves thereon, first means positioned adjacent said path with a signal to be amplified applied thereto for modualting said beam in both the fast and slow space charge modes with said signal, second means upstream of said first means for converting the fast mode noise waves on said beam into a predetermined ratio and magnitude of fast to slow mode noise waves which assures complete abstraction of said waves by said first means, third means adjacent said path downstream of said first means for converting the fast and slow mode space charge signal waves on said beam into only fast mode signal waves, fourth means further downstream and adjacent said path for modulating said beam solely in the fast mode with radio-frequency energy of a predetermined frequency and means downstream of said last-mentioned means for abstracting amplified power in said fast mode signal waves.

2. A high frequency electron discharge device in accordance with claim 1 wherein said first means comprises a helix operated at the "Kompfner Dip" condition.

3. A high frequency electron discharge device in accordance with claim 1 wherein said second and third means each comprises two collinear conductive drift tube sections separated by a short longiutdinal gap with means for establishing a potential difference between said drift tube sections whereby there is established an electric field which produces an abrupt predetermined change in the velocity of said beam.

4. A high frequency electron discharge device in accordance with claim 1 wherein said second and third means each comprises means defining two adjacent longitudinal magnetic focusing field regions of different magnetic field intensities for establishing an abrupt predetermined change in the electron beam diameter.

5. A high frequency electron discharge device in accordance with claim 1 wherein said second and third means each comprises two collinear conductive drift tube sections having adjacent ends of different predetermined diameters.

6. A high frequency amplifier comprising means for forming and projecting an electron beam along an extended path, said beam being characterized by the presence of both fast and slow mode noise waves thereon, first means positioned adjacent said path with a signal to be amplified applied thereto for modulating said beam in both the fast and slow space charge modes with said signal, second means upstream of said first means for converting the fast mode noise waves on said beam into a predetermined ratio and magnitude of fast to slow mode noise waves which assures complete abstraction of said waves by said first means, third means adjacent said path downstream of said first means for converting the fast and slow mode space charge signal waves on said beam into only fast mode signal waves, fourth means further downstream and adjacent said path for modulating said beam solely in the fast mode with radio-frequency energy of a predetermined frequency, fifth means downstream of said last-mentioned means and adjacent said path for converting the fast mode space charge amplified signal waves into a predetermined ratio and magnitude of fast to slow mode space charge signal waves and sixth means downstream of said last-mentioned means for abstracting the amplified power in said fast mode signal waves.

7. A high frequency amplifier in accordance with claim 6 wherein said first and sixth means comprise helices operated at the "Kompfner Dip" condition.

8. A high frequency amplifier in accordance with claim 6 wherein said second, third, and fifth means each comprises two collinear conductive drift tube sections separated by a short longitudinal gap with means for establishing a potential difference between said drift tube sections whereby there is an electric field established which produces an abrupt predetermined change in the velocity of said beam.

9. A high frequency amplifier in accordance with claim 6 wherein said second, third, and fifth means each comprises means defining two adjacent longitudinal magnetic focusing field regions of different magnetic field intensities for establishing an abrupt predetermined change in the electron beam diameter.

10. A high frequency amplifier in accordance with claim 6 wherein said second, third, and fifth means each comprises two collinear conductive drift tube sections having adjacent ends of different predetermined diameters.

11. A high frequency amplifier in accordance with claim 10 wherein the respective drift tube sections with adjacent ends are characterized by one of said sections tapering from a diameter maximum to a diameter minimum at a point furthest removed from the other of said two adjacent drift tube sections.

12. A high frequency amplifier in accordance with claim 11 further comprising a tapered dielectric member of uniform inner diameter and an extremely fine pitch conductive helix of uniform diameter positioned axially and successively within each of said tapered drift tube sections.

13. A high frequency amplifier comprising means for forming and projecting an electron beam along an extended path, said beam being characterized by the presence of both fast and slow mode noise waves thereon, wave propagation means comprising a helix operated at the "Kompfner Dip" condition positioned adjacent said path with a signal to be amplified applied thereto for modulating said beam in both the fast and slow space charge modes with said signal, space charge wave discontinuity means positioned upstream of said wave propagation means for converting the fast mode noise waves on said beam into a predetermined ratio and magnitude of fast to slow mode noise waves which assures complete abstraction of said waves by said wave propagation means, said wave discontinuity means comprising two collinear conductive drift tube sections separated by a short longitudinal gap with means for establishing a potential difference between said drift tube sections whereby there is established an electric field which produces an abrupt predetermined change in the velocity of said beam, means adjacent said path downstream of said wave propagation means for converting the fast and slow mode signal waves on said beam into only fast mode signal waves, said means comprising two collinear conductive drift tube sections separated by a short longitudinal gap and including means for establishing a potential difference between said drift tube sections whereby there is established an electric field which produces an abrupt predetermined change in the velocity of said beam, means further downstream and adjacent said path for modulating said beam solely in the fast mode with radio-frequency energy of a predetermined frequency, and means downstream of said last-mentioned means for abstracting the amplified power in said fast mode signal waves.

14. A high frequency amplifier in accordance with claim 13 wherein said means for abstracting the fast mode signal power includes means adjacent said path for converting the fast mode space charge amplified signal waves into a predetermined ratio and magnitude of fast to slow mode space charge signal waves, said last-mentioned means comprising two collinear conductive drift tube sections separated by a short longitudinal gap with means for establishing a potential difference between said drift tube sections whereby there is established an electric field which produces an abrupt predetermined change in the velocity of said beam and helix means downstream of said last-mentioned wave conversion means operated at the "Kompfner Dip" condition for abstracting the power in said converted amplified fast and slow mode signal waves.

15. A high frequency amplifier comprising means for forming and projecting an electron beam along an extended path, said beam being characterized by the presence of both fast and slow mode noise waves thereon, wave propagation means comprising a helix operated at the "Kompfner Dip" condition positioned adjacent said path with a signal to be amplified applied thereto for modulating said beam in both the fast and slow space charge modes with said signal, space charge wave discontinuity means positioned upstream of said wave propagation means for converting the fast mode noise waves on said beam into a predetermined ratio and magnitude of fast to slow mode noise waves which assures complete abstraction of said waves at the output of said wave propagation means, said wave discontinuity means comprising means defining two adjacent longitudinal magnetic focusing field regions of different magnetic field intensities for establishing an abrupt predetermined change in the electron beam diameter, means adjacent said path downstream of said wave propagation means for converting the fast and slow mode space charge signal waves on said beam into only fast mode waves, said last-mentioned means comprising means defining two adjacent longitudinal magnetic focusing field regions of different magnetic field intensities for establishing an abrupt predetermined change in the electron beam diameter, means further downstream and adjacent said path for modulating said beam solely in the fast mode with radio-frequency energy of a predetermined frequency and means downstream of said last-mentioned means for abstracting the amplified power in said fast mode signal waves.

16. A high frequency amplifier in accordance with claim 15 wherein said means for abstracting the fast mode signal power includes means adjacent said path for converting the fast mode space charge amplified signal waves into a predetermined ratio and magnitude of fast to slow mode space charge signal waves, said last-mentioned means comprising means defining two adjacent longitudinal magnetic focusing field regions of different magnetic field intensities for establishing an abrupt predetermined change in the electron beam diameter and helix means downstream of said last-mentioned wave conversion means operated at the "Kompfner Dip" condition for abstracting the amplified power in said converted fast and slow mode signal waves.

17. A high frequency amplifier comprising means for forming and projecting an electron beam along an extended path, said beam being characterized by the presence of both fast and slow mode noise waves thereon, wave propagation means comprising a helix operated at the "Kompfner Dip" condition positioned adjacent said path with a signal to be amplified thereto for modulating said beam in both the fast and slow space charge modes with said signal, space charge wave discontinuity means upstream of said wave propagation means for converting the fast mode noise waves on said beam into a predetermined ratio and magnitude of fast to slow mode noise waves which assures complete abstraction of said waves by said wave propagation means, said wave discontinuity means comprising two collinear conductive drift tube sections having adjacent ends of different predetermined diameters, the end of largest diameter tapering from a diameter maximum to a diameter minimum at a point furthest removed from the other of said two drift tube sections, means adjacent said path downstream of said wave propagation means for converting the fast and slow mode space charge signal waves on said beam into only fast mode waves, said last-mentioned means comprising two collinear conductive drift tube sections having adjacent ends of different predetermined diameters, the end of largest diameter tapering from a diameter maximum to a diameter minimum at a point furthest removed from the other of said two drift tube sections, means further downstream and adjacent said path for modulating said beam solely in the fast mode with radio-frequency energy of a predetermined frequency and means downstream of said last-mentioned means for abstracting the amplified power in said fast mode signal waves.

18. A high frequency amplifier in accordance with claim 17 wherein said means for abstracting the fast mode signal power includes means adjacent said path for converting the fast mode space charge amplified signal waves into a predetermined ratio and magnitude of fast to slow mode space charge sgnal waves, said last-mentioned means comprising two collinear conductive drift tube sections having adjacent ends of different predetermined diameters, the end of largest diameter tapering from a diameter maximum to a diameter minimum at a point furthest removed from the other of said two drift tube sections and helix means downstream of said last-mentioned wave conversion means operated at the "Kompfner Dip" condition for abstracting the amplified power in said converted fast and slow mode signal waves.

19. A high frequency amplifier in accordance with claim 18 further comprising a tapered member of uniform inner diameter and of dielectric material and a fine pitch conductive helix positioned axially and successively within each of said tapered drift tube sections.

20. A space charge wave filter for use in velocity type devices utilizing an electron beam, said beam being characterized by the presence of both fast and slow mode noise waves thereon, comprising wave propagation means positioned adjacent the path of said electron beam, and means upstream of said wave propagation means for converting the fast mode waves on said beam into a predetermined ratio and magnitude of fast to slow mode waves which assures complete abstraction of said waves by said wave propagation means.

21. A space charge wave filter in accordance with claim 20 wherein said wave propagation means comprises a helix operated at the "Kompfner Dip" condition.

22. A space charge wave filter in accordance with claim 20 wherein said means upstream of said wave propagation means comprises two collinear conductive drift tube sections separated by a short longitudinal gap with means for establishing a potential difference between said drift tube sections whereby there is established an electric field which produces an abrupt predetermined change in velocity of said beam.

23. A space charge wave filter in accordance with claim 20 wherein said means upstream of said wave propagation means comprises means defining two adjacent longitudinal magnetic focusing field regions of different magnetic field intensities for establishing an abrupt predetermined change in electron beam diameter.

24. A space charge wave filter in accordance with claim 20 wherein said means upstream of said wave propagation means comprises two collinear conductive drift tube sections having adjacent ends of different predetermined diameters.

25. A space charge wave filter in accordance with claim 24 wherein said drift tube section having an adjacent end of largest diameter tapers from a diameter maximum to a diameter minimum at a point furthest removed from the other of said two drift tube sections.

26. A space charge wave filter in accordance with claim 25 further comprising a tapered dielectric member of uniform inner diameter and an extremely fine pitch conductive helix of uniform diameter positioned axially and successively within said tapered drift tube section.

27. A space charge wave filter for use in velocity modulation type devices utilizing an electron beam, said being characterized by the presence of both fast and slow mode waves thereon, comprising wave propagation means positioned adjacent the path of said electron beam, signal input coupling means connected to the input end of said wave propagation means, means upstream of said wave propagation means for converting the fast mode waves on said beam into a predetermined ratio and magnitude of fast to slow mode waves which assures complete abstraction of said waves by said wave propagation means, and means adjacent said path downstream of said wave propagation means for converting the fast and slow mode space charge signal waves on said beam into only fast mode signal waves.

28. A space charge wave filter in accordance with claim 27 wherein said wave propagation means comprises a helix operated at the "Kompfner Dip " conditions.

29. An electron discharge device comprising means for forming and projecting an electron beam along an extended path, means for coupling signal energy to said beam, a first means for presenting an electrical discontinuity to said beam positioned immediately before said coupling means, a second means for presenting an electrical discontinuity to said beam positioned immediately after said coupling means, means to the other side of said second discontinuity means than said coupling means for attaining amplification of the signal energy on said beam, and means for collecting said beam.

30. An electron discharge device in accordance with claim 29 further comprising output means for receiving said amplified signal energy from said beam, and a third means for presenting an electrical discontinuity to said beam positioned immediately prior to said output means.

31. An electron discharge device comprising means for forming and projecting an electron beam along an extended path, said beam being characterized by the presence of both fast and slow mode noise waves, means for coupling a signal to said beam in both fast and slow mode waves, a first means for presenting an electrical discontinuity to said beam positioned immediately preceding said coupling means for converting said fast mode noise waves to distinct fast and slow mode noise waves, means connected to said coupling means for absorbing said distinct fast and slow mode noise waves, and a second means for presenting an electrical discontinuity to said beam immediately succeeding said coupling means for converting said signal fast and slow mode waves to solely a fast mode wave.

32. An electron discharge device comprising means for forming and projecting an electron beam along an extended path, said beam being characterized by the presence of both fast and slow mode noise waves, means for coupling a signal to said beam in both fast and slow mode waves, a first means for presenting an electrical discontinuity to said beam immediately preceding said coupling means for converting said fast mode noise waves to first fast and slow mode noise waves and for converting said slow mode noise waves to second fast and slow mode noise waves, means connected to said coupling means for absorbing said first fast and slow mode noise waves from said beam, and a second means for presenting an electrical discontinuity to said beam immediately succeeding said coupling means for converting said slow and fast mode signal waves solely to fast mode signal waves and for converting said second fast and slow mode noise waves solely to slow mode noise waves.

References Cited in the file of this patent

UNITED STATES PATENTS

| | | |
|---|---|---|
| 2,494,721 | Robertson | Jan. 17, 1950 |
| 2,579,480 | Feenberg | Dec. 25, 1951 |
| 2,638,539 | Cuccia | May 12, 1953 |
| 2,762,948 | Field | Sept. 11, 1956 |
| 2,767,259 | Peter | Oct. 16, 1956 |
| 2,800,602 | Field et al. | July 23, 1957 |
| 2,800,606 | Tien et al. | July 23, 1957 |
| 2,805,333 | Waters | Sept. 3, 1957 |
| 2,806,974 | Haeff | Sept. 17, 1957 |
| 2,859,374 | Birdsall et al. | Nov. 4, 1958 |

OTHER REFERENCES

Proc. I.R.E., April 1958, pp. 707–716, Parametric Amplification of Space Charge Waves, by W. H. Louisell and C. F. Quate.

Proc. I.R.E., vol. 46, No. 6, June 1958, pp. 1300–1301, Parametric Amplification of the Fast Electron Wave, by Robert Adler.